Aug. 7, 1956 E. W. DAVIS 2,757,782
APPARATUS FOR FEEDING MATERIALS
Filed Feb. 28, 1952 8 Sheets-Sheet 2

INVENTOR.
EDWARD W. DAVIS
BY
ATTORNEYS

Aug. 7, 1956
E. W. DAVIS
2,757,782
APPARATUS FOR FEEDING MATERIALS
Filed Feb. 28, 1952
8 Sheets-Sheet 3
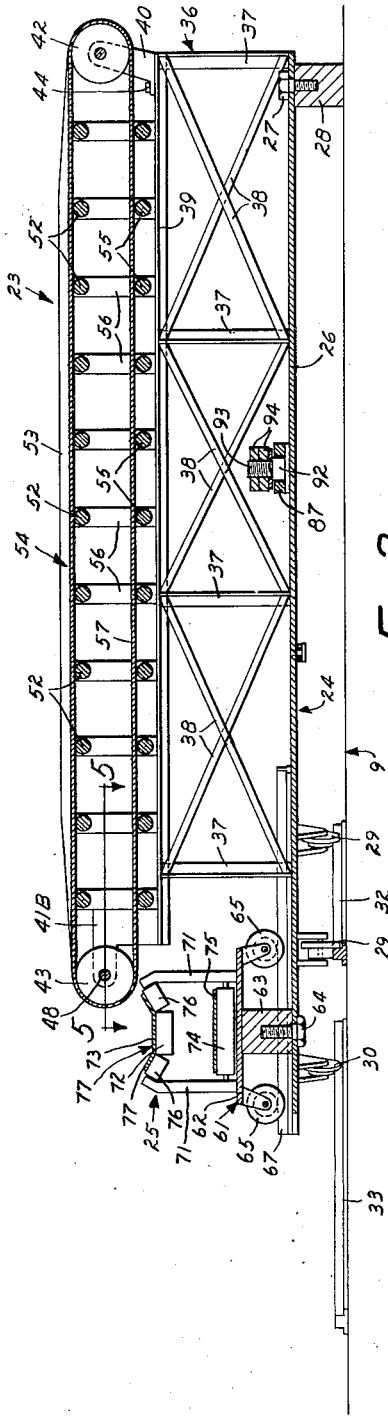
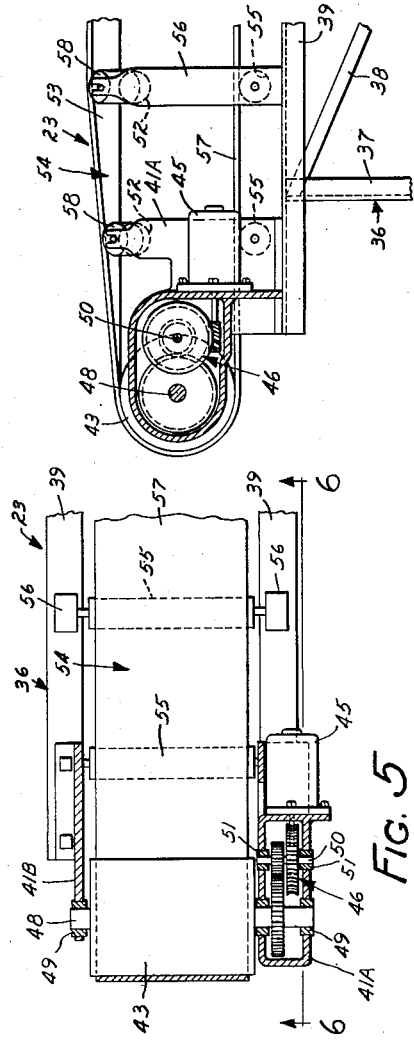
INVENTOR.
EDWARD W. DAVIS
BY Paul, Paul & Moore
ATTORNEYS

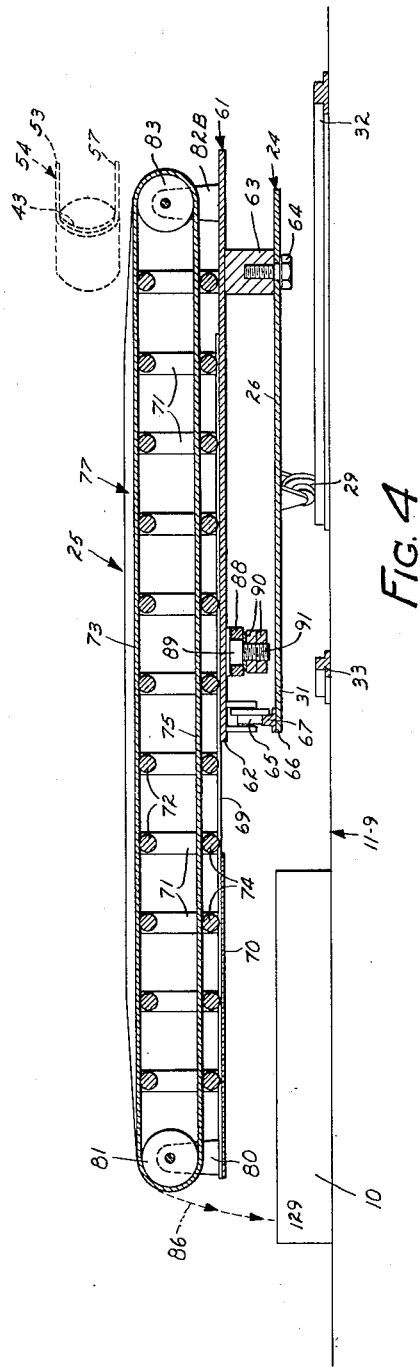

Aug. 7, 1956  E. W. DAVIS  2,757,782
APPARATUS FOR FEEDING MATERIALS
Filed Feb. 28, 1952  8 Sheets-Sheet 5

INVENTOR.
EDWARD W. DAVIS
BY Paul, Paul & Moore
ATTORNEYS

Aug. 7, 1956     E. W. DAVIS     2,757,782
APPARATUS FOR FEEDING MATERIALS
Filed Feb. 28, 1952     8 Sheets-Sheet 6

INVENTOR.
EDWARD W. DAVIS
BY Paul, Paul & Moore
ATTORNEYS

INVENTOR.
EDWARD W. DAVIS

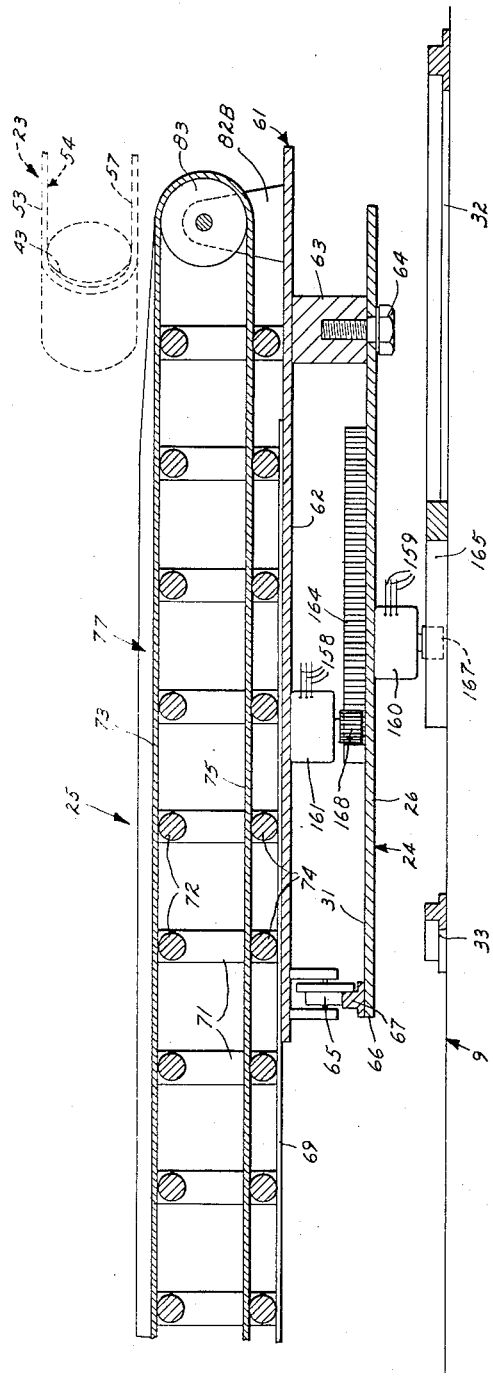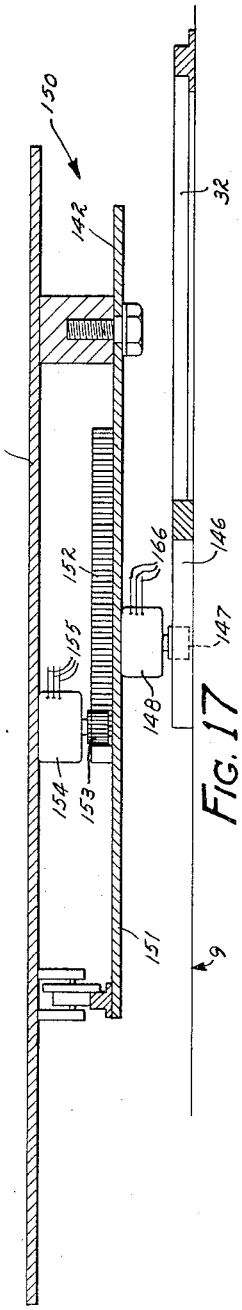

United States Patent Office 2,757,782
Patented Aug. 7, 1956

2,757,782
APPARATUS FOR FEEDING MATERIALS

Edward W. Davis, Minneapolis, Minn., assignor to Reserve Mining Company, Duluth, Minn., a corporation of Minnesota Application February 28, 1952, Serial No. 274,007

28 Claims. (Cl. 198—86)

This invention relates to new and useful improvements in apparatus for feeding materials to a designated place and more particularly to new and useful improvements in apparatus for distributing a uniform layer of charge over a furnace bed surface.

This invention may be utilized for many different types of conveying and feeding operations but is particularly directed to the feeding of charging material to furnaces having a large bed area such as agglomerating furnaces or the like. In the processing of iron ore, for example, the concentrated ore while still moist may be formed into balls or briquettes. For storage, shipping and use in a blast furnace, the moist and not yet strong balls or briquettes must be fired at high temperatures to harden them and remove moisture. This is accomplished by burning fuel progressively upward through a mass of such balls (or briquettes), more balls (or briquettes) being continuously fed onto the top of the mass in a uniform layer. This presents difficulties in furnace feeding since the material handled is relatively fragile and cannot be leveled by scraping but must be evenly distributed and left where it falls. Also great depths of material may be built up in the furnace before it is allowed to cool, hence distribution must be uniform, otherwise accummulated irregularities in distribution would leave humps and holes, porous spots and tight spots.

It is therefore an object of this invention to provide a new and useful apparatus for conveying and distributing material;

It is an object of the present invention to provide a feeding apparatus wherein the material fed is carried and evenly deposited in a uniform layer over a prescribed layer. While the invention has particular applicability to the feeding of agglomerating furnaces there are many other situations where it is equally adaptable, viz. storing coal, rock and the like, distributing fill, distributing agricultural waste such as hulls, pods, vines, etc. at pea viners, and the like;

It is also an object of this invention to provide a new and useful apparatus for conveying and distributing a layer of charge on the bed surface of a furnace;

It is a further object of this invention to provide new and useful feeding apparatus which is capable of uniformly distributing a layer of material over a predetermined area;

It is a further object of this invention to provide new and useful feeding apparatus for the uniform distribution of a layer of charge to furnaces having various cross-sectional configurations;

It is also an object of this invention to provide a new and useful apparatus particularly adapted for feeding uniformly layer after layer of charge on the bed of a vertical shaft furnace in which the hot gases escape through the open top of the furnace and the charge after treatment is extracted from the bottom thereof;

It is a further object of this invention to provide a feeding apparatus which will continuously repeatedly or automatically follow a predetermined pattern to feed a uniform layer of material;

It is a further object of this invention to provide a feeding apparatus which is adapted for movement in various directions over the top of a charging opening so as to deliver a uniform layer of charge therein;

Still another object of this invention is to provide a furnace feeding apparatus which is adapted for movement in various directions over the hot bed of a furnace, the operating mechanism of which will be substantially continuously extending over the portion of the furnace bed to which the cold charge has already been added;

It is a further object of this invention to provide a feeding and conveying mechanism comprising a linkage of two members, one member being attached at one end to a stationary pivot point and at the other end to a second member by a movable pivot point, each of said members comprising a conveyor belt, the conveyor belt of the first member being positioned for transferring charge to the conveyor belt of the second which in turn is positioned for distribution of the charge, the two belts being swung arcuately about their respective pivots and in conjunction with each other for substantially uniformly distributing the load over a prescribed area;

Other objects of this invention reside in the provision of a pantograph type feeder and in the construction of the feeding and tracking apparatus therefor;

Still other objects of this invention reside in the provision of a feeder which is adapted to follow a predetermined pattern in accordance with signal or control impulses transmitted from a remote control station;

Still other objects of this invention reside in the provision of an apparatus whereby the distribution of several feeders in series parallel at several separate distribution areas may be uniformly controlled in response to a predetermined pattern, said pattern controlling the operation of said feeders through a remote feeder control;

Other objects of the invention are those inherent and apparent in the invention as described, pictured and claimed.

This invention will be described with reference to the drawings in which corresponding numerals refer to the same parts and in which:

Figure 3 is a vertical sectional view of the first of two cooperating conveyors in the feeding apparatus, this view being taken along the lines 3—3 of Figure 2;

Figure 4 is a vertical sectional view of the second of the two cooperating conveyors of the feeding apparatus this view being taken along the lines 4—4 of Figure 2;

Figure 5 is a fragmentary plan view of the delivery end of the first conveyor, this view being partly broken away along the lines 5—5 of Figure 3 and shows the driving mechanism for the first conveyor which is shown in Figure 3;

Figure 6 is a fragmentary vertical sectional view taken along the lines 6—6 of Figure 5;

Figure 10:
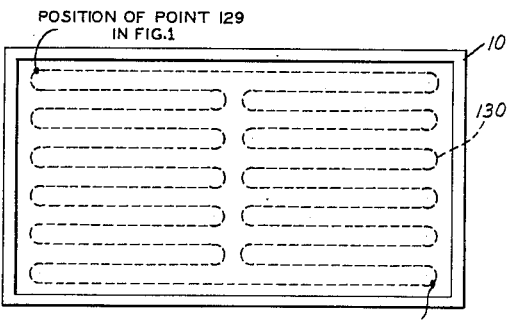
Figure 11:
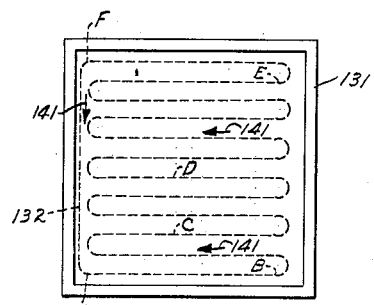
Figure 12:
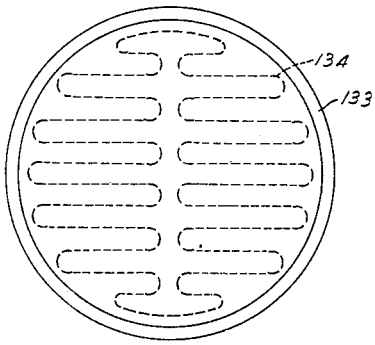
Figure 13:
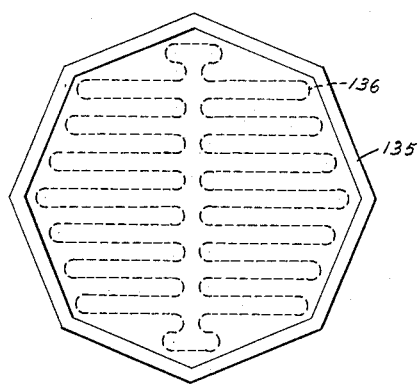
Figure 14:
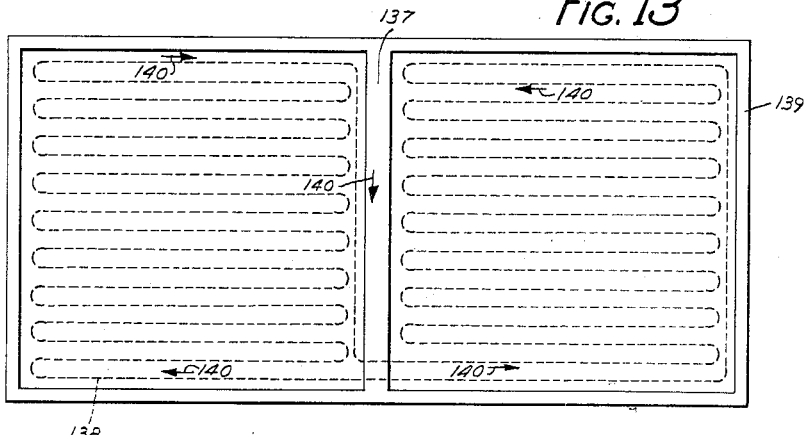
Figure 15:
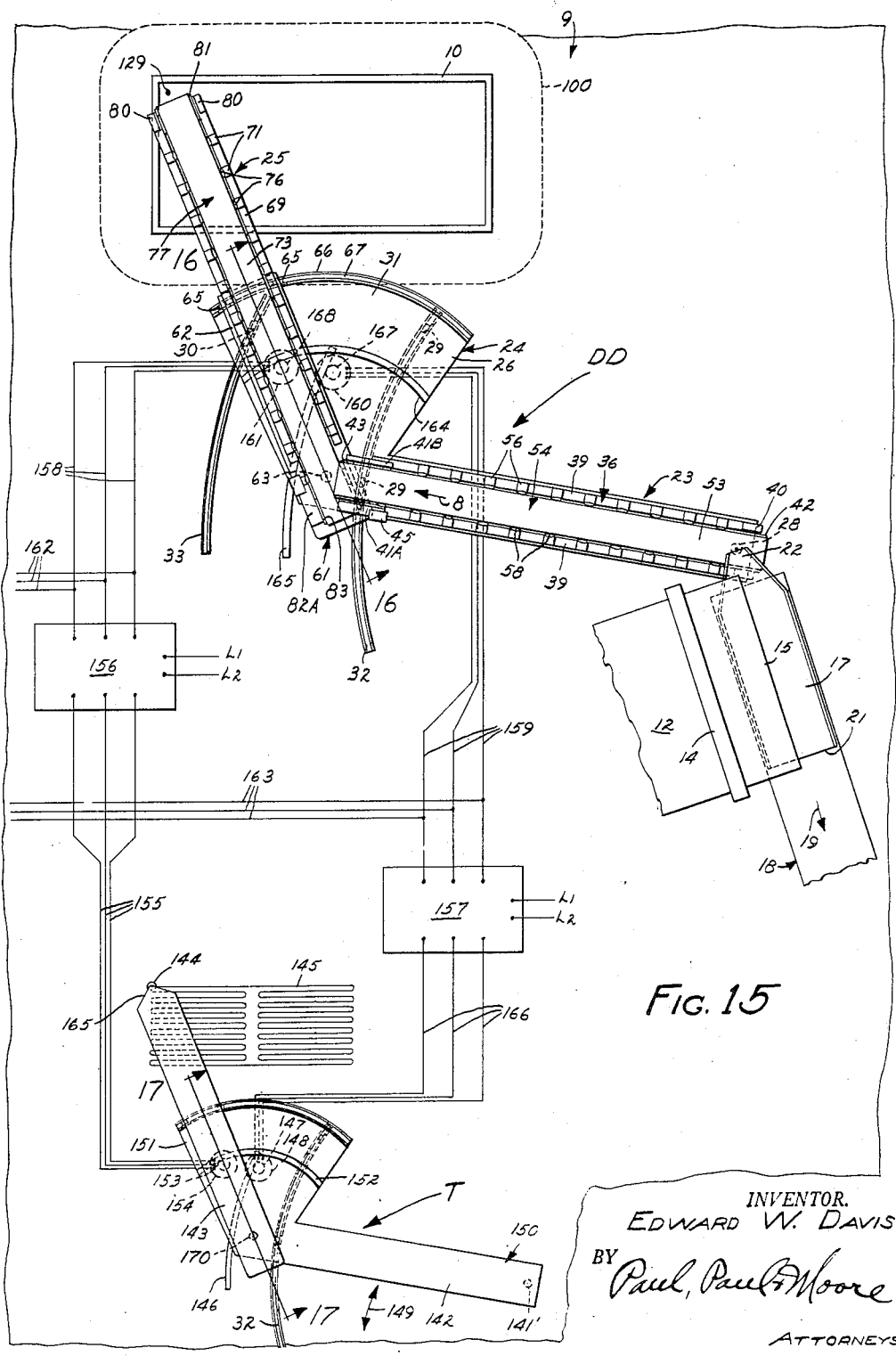

Figures 10-14 are schematic views showing various feeding patterns for different shaped plans of delivery; Figures 10 and 11 are directed to a rectangular and square furnace respectively; Figure 12 shows a circular plan; Figure 13 shows an octagonal plan and Figure 14 shows a double-square plan with a partition wall or interruption therebetween;

Figure 15 is a plan view partly schematic of a modified form of this invention showing an electrical remote control means for the feeding apparatus;

Figure 16 is an enlarged vertical sectional view of the second of the two cooperating feeder conveyors of Figure 15 taken along lines 16—16 of Figure 15;

Figure 17 is an enlarged vertical sectional view of one of the remote control arms of Figure 15 taken along lines 17—17 thereof.

Referring particularly to Figures 1-9 there is illustrated an exemplary form of the invention wherein it is adapted for feeding a charge into the rectangular mouth of a vertical shaft furnace of the type used for sintering (burning) nodules (balls) of concentrated ore such as iron ore. These figures are an example of the use of the invention but are not to be considered as a limitation thereon. In Figures 1-9, the furnace is a vertical shaft of rectangular plan. It is essentially a pit and in the operation thereof a fire is started at the bottom, or a heated charge is dumped in initially to start combustion. Then "green" nodules, or "ball" of concentrated ore containing optionally some finely divided solid fuel is fed in, and air optionally containing gas is started blowing in through ports at the bottom and flameless combustion ensues, and burns up through the charge. More fresh charge is added and burning continues on up through the ever continuing fresh layers of unburned charge. The "burned" (sintered) charge may be removed by bottom delivery, or the furnace may simply be kept on until full and then allowed to cool, whereupon the charge may be removed with a clamshell bucket. The details of such furnaces and their modes of operation form no part of the present invention, being mentioned here only to illustrate practical situations in which the instant invention may be utilized.

The herein illustrated furnace has a rectangular horizontal cross-sectional plan, as at 10 and it is open at the top, so as to allow the charge to be fed in and the products of combustion and evaporated moisture to escape. Around the furnace and near its top opening 10 there is a surrounding steel horizontal charging floor generally designated 9. The furnace may be tall, in which case the charging floor 9 is suitably supported on framing, not shown, at a level near the furnace top. In the illustrated furnace the mouth 10 is rectangular but the furnace plan or other delivery area over which material is to be delivered may be circular, rectangular, square or of other configuration, or even "double" or "multiple" plans, for the present invention may be arranged to delivery in any plan area. The bed of the furnace illustrated is commonly of the same dimensions and configurations as the charging mouth 10. The delivery of the charge is usually desired to be of uniform depth but in some instances it is desirable to build up the material to somewhat greater depth at the walls or other desired layer-depth pattern, and this can be achieved by the use of my invention.

Figure 1:
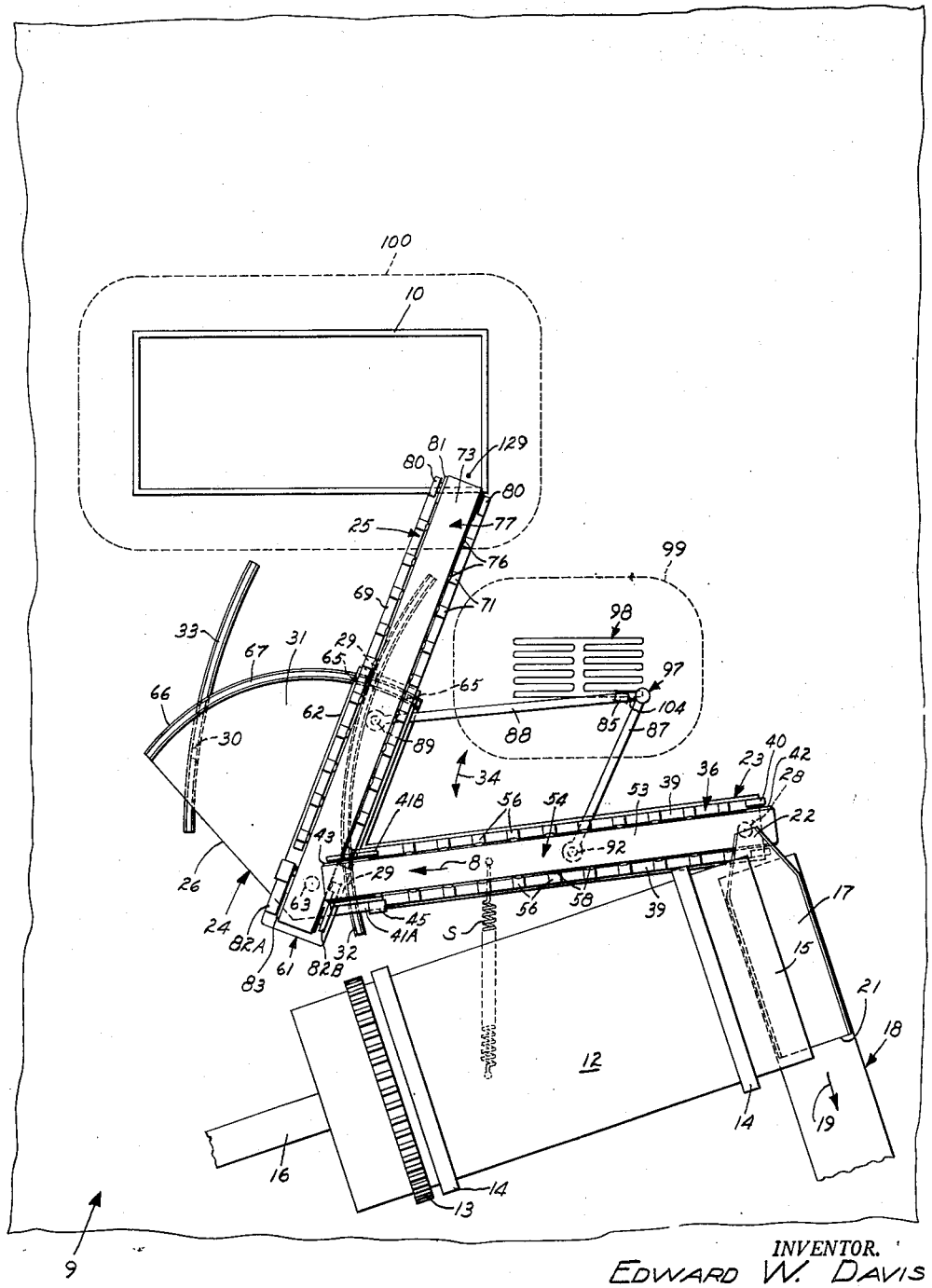
Figure 1 is a top plan view of one form of the feeding apparatus of the present invention positioned over a furnace, and including a furnace bed and feeding pattern control schematically displayed thereon, said feeding apparatus being shown in feeding position at one corner of a furnace of rectangular cross-sectional plan.

Shown in Figure 1 is a device for making the nodules or balls which are delivered and charged into the furnace. In this instance this device is a balling drum 12 having two rings 14—14 attached to the periphery thereof for supporting the weight of the rotating drum and a ring gear 13 which is driven by pinion (not shown) for rotating drum 12. Of course, it is to be understood that the drum per se forms no part of this invention; consequently, other means for making and bringing the material to be charged or delivered to the delivery mechanism hereof may be substituted for the drum.

The drum has a feeder 16 through which the material to be balled is sent into the drum. The finished balls, which may vary in size and also in completeness of balling are discharged onto a screen 17 which may be stationary but is preferably vibrated by any desired means. Beneath the screen 17 there is a conveyor 18 moving in the direction of the arrow 19, which serves to return to the balling drum 12 the small, broken or incomplete balls, dust and fine particles which fall through the surface of screen 17. Screen 17 inclines downwardly from end 21 to a tapered delivery end 22 by which the finished balls are discharged upon the first of two cooperating conveyors herein designated conveyor 23 of the furnace feeder generally designated 24. The second of the cooperating conveyors is designated 25 and is adapted to receive the material from the discharge end of conveyor 23 as will be subsequently explained.

In the apparatus herein illustrated the conveyors are shown as endless belt conveyors but other forms of conveyors may be used such as screw conveyors, the so-called air-slide conveyors, vibratory conveyors or the like. Even shuttle conveyors may be used. Therefore, it must be understood that the belt conveyors shown are merely illustrative and any equivalent linear conveyors may be used.

Figure 2:
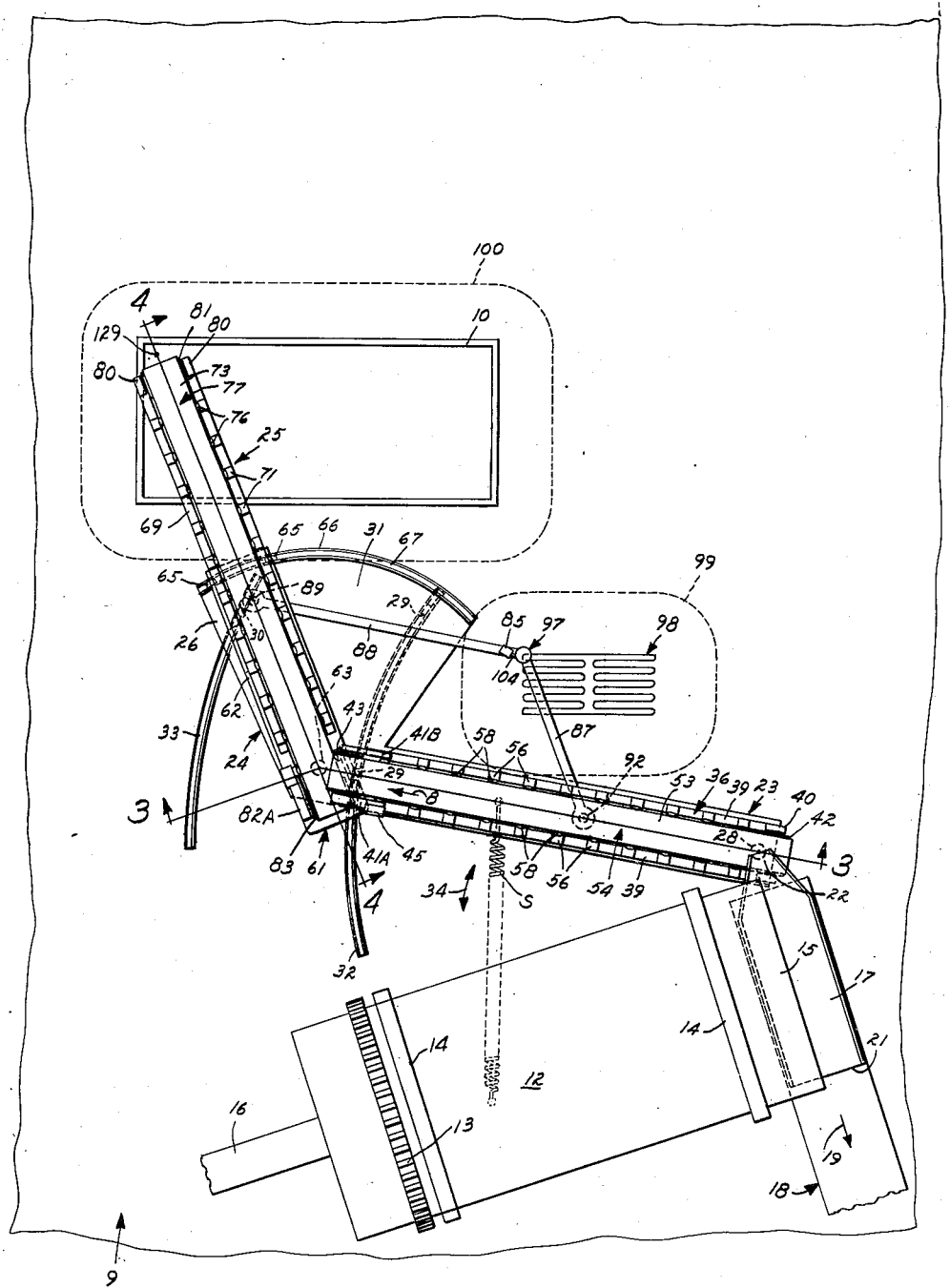
Figure 2 is a view similar to Figure 1 but showing the feeding apparatus in feeding position at the other end of the rectangular furnace of Figure 1.
Figure 7:
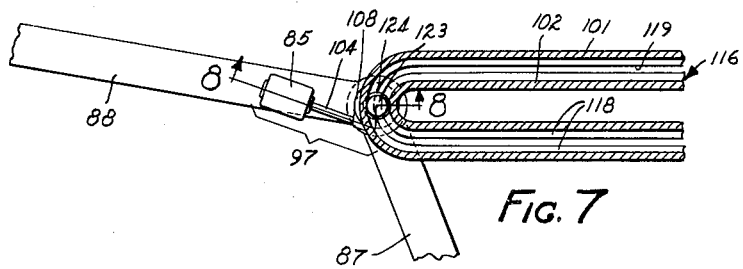
Figure 7 is an enlarged fragmentary horizontal sectional view of a part of one form of feeding mechanism that is used (in the form of invention shown in Figures 1–9) to establish the feeding pattern of the device, this view being taken along the lines 7—7 of Figure 8.
Figure 8:
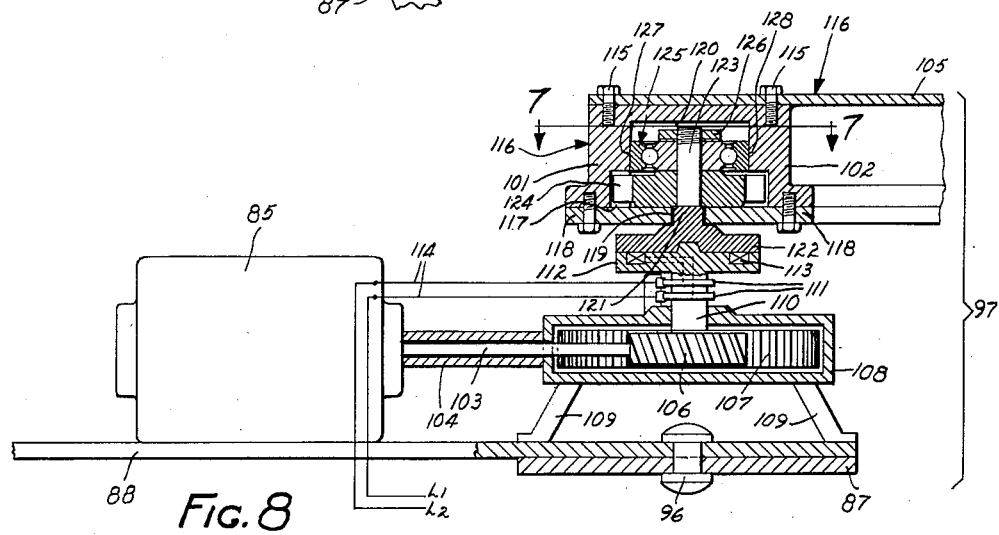
Figure 8 is an enlarged fragmentary vertical sectional view taken along the lines 8—8 of Figure 7 and illustrates an optional form of magnetic coupling used in the feeding mechanism.
Figure 9:
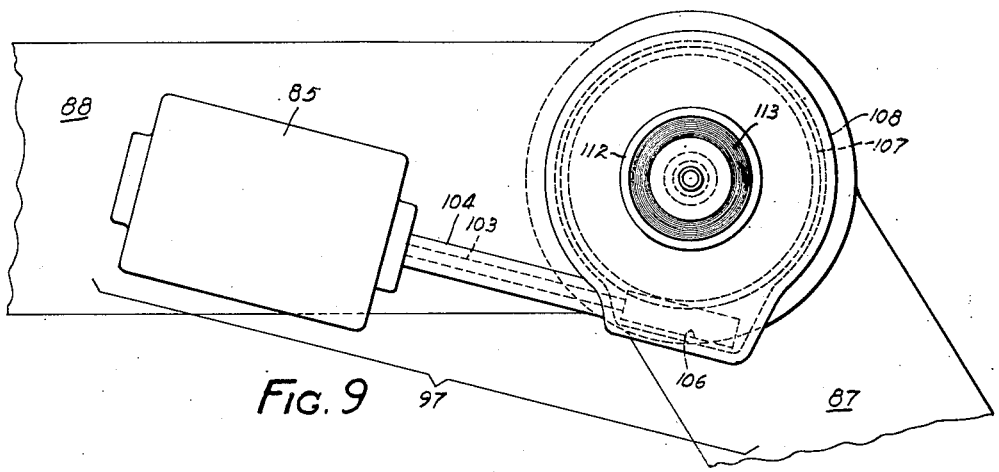
Figure 9 is an enlarged fragmentary plan view of the stylus arms of Figures 7 and 8, showing the male portion of the magnetic coupling disconnected from the female portion of said coupling.

Both of the conveyors 23 and 25 are in the illustrated form of invention supported upon a framing 26 which may be seen best with reference to Figures 1 and 2. Member 26 is pivoted on a fixed vertical pintle such as cap screw 27 threaded into a supporting pivot stud 28 on charging floor 9, as is shown best in Figure 3. The free or swinging end of member 26 is enlarged to form a quadrant 31 upon which is supported track 67, which in turn supports the second conveyor 25. The quadrant end 31 and the free end of frame 26, with all the load upon it is supported by flanged wheels 29 and 30 which run on the curved tracks 32 and 33 which are arcuate about the pivot 27. The wheels 29—29 and 30 are widely spaced, being positioned substantially adjacent opposite edges of the enlarged portion 31 of member 26 and in this way they provide lateral support for the overhanging load of conveyor 25 while a plate 26—31 is illustrated, this may, if desired, simply be open structural steel, wheels 29—29—30 being distributed thereon and sufficiently spaced to supply requisite support and stiffness. Also the wheels can operate directly upon floor 9, if the floor is strong and able to take the load. Thus, with reference to Figures 1 and 2 the supporting plate 26 by virtue of the action of wheels 29—29—30 upon rails 32 and 33 is free to move arcuately back and forth, as shown by the double arrow 34, around pivot 28 as a center.

A supporting frame 36 for first conveyor 23 extends from adjacent pivot 22 to adjacent a pivot 63 which is supported on the portion 31 of plate 26, as shown in Figures 1-3. Supporting frame 36 is composed of a series of uprights 37 and cross braces 38 which serve to support a pair of top rails 39, which in turn support two pairs of journal arms 40 and 41A and 41B; the uprights 37, the cross braces 38 and the rails 39 all serving to provide a first supporting conveyor frame generally designated 36. The specific frame construction may be varied widely so long as it is adequate to support the conveyor rollers, belt and drive.

The pairs of journal arms 40 and 41A and 41B serve to support an idler pulley 42 and a drive pulley 43 as is best shown with reference to Figure 3. The journal arms 40 to the idler pulley 42 are identical and are attached to rails 39 by slots and by cap screws 44 so as to allow belt adjustment. The frame member 41B merely serves to support one end of shaft 48 of drive pulley 43, and the frame member 41A supports the other end of the shaft and also forms one wall of a reduction gear housing as is shown best with reference to Figures 5 and 6. A motor 45, bolted to frame and housing 41A, drives a reduction gearing generally designated 46 which in turn drives shaft 48 of drive pulley 43. The shaft 48 of pulley 43 is journalled in bearing 49 of members 41A and 41B as is illustrated in Figure 5. The shaft 50 of the reduction gearing is also journalled in bearings 51 of journal housing 41A.

A plurality of idler rollers 52 serves to support the upper run 53 of the first conveyor belt generally designated 54, the lower run being supported by idler rollers 55. All of the idlers are journalled on a plurality of supporting uprights 56 attached to rails 39. The belt 54 is driven at one end by drive pulley 43 and supported at the other end by idler pulley 42. As is shown best in Figures 3 and 6, the upper run 53 of the conveyor belt 54 is supported by inclined rollers 58 so as to be provided with a trough shape. This may also be seen with reference to the belt 77 of the second conveyor 25 in Figure 3 which diagrammatically illustrates the rollers 72 and 76 which are identical with rollers 58 and 52 of conveyor 23.

The second cooperating conveyor of the system, namely conveyor 25 is wholly supported on the frame 61 as may best be seen with reference to Figures 1, 2 and 4. Supporting frame generally designated 61 is pivoted at pivot block 63, which is secured to supporting plate 26 by cap screw 64 so that the receiving end of second conveyor 25 will be anchored for pivotal swinging movement about pivot 63. Pivot point 63 is located at the delivery point of conveyor 23 and the conveyor 25 therefore receives the material discharged from conveyor 23 regardless of the pivotal movement of conveyor 25. This is shown in Figures 1 and 2 and Figure 4. Base plate 62 of conveyor 25 extends to the edge of or slightly beyond the edge of enlarged portion 31 of frame 26 as is shown best with reference to Figure 4 and is provided at the outwardly extending end thereof with flanged supporting wheels 65 similar to wheels 29—29—30, which support frame 26. Positioned along the arcuate periphery 66 (portion 31 of frame 26) and on the top side thereof is an arcuate 67 similar to rails 32 and 33. Rail 67 serves to support the wheels 65 which in turn support the base plate 62 and consequently frame 61 of conveyor 25 for pivotal movement about pivot 63.

Securely attached to the top surface of pivoted base plate 62 is frame extension 69 of the second conveyor 25. Frame extension 69 serves as a support for the delivery end (in this case the idler) pulley 81. The extending end of the conveyor 25 is exposed to heat and moisture and is provided with an asbestos or other fire resistant shield 70 along its underside to protect the belt. If it is desired, the extension 69 and the reinforced or supporting plate 62 may be constructed integrally, being merely illustrative.

A plurality of uprights 71 (similar to uprights 56 of conveyor 23) are affixed to extension 69 and plate 62 and serve to support the conveyor rollers 72 for the upper run 73 of conveyor belt 77 and a plurality of rollers 74 for the lower run 75 of the belt 77. As is shown best with reference to Figures 3 and 4 and as discussed previously with reference to conveyor 23, the upper run 73 of the conveyor belt 77 is also supported at the edges thereof by a plurality of inclined rollers 76 so as to bend the belt to a trough shape. A pair of frame arms 80 are provided on the delivery end to support the delivery end (idler) pulley 81. A second pair of frame members 82A and 82B are constructed similar to the frame members 41A and 41B of conveyor 23 and support the drive pulley 83 and its gear drive and motor in a manner similar to the drive of conveyor 23. In the instance of conveyor 25, however, the drive end of the conveyor is the receiving end (adjacent pivot 63—64) whereas for conveyor 23, the drive end of the belt is the delivery end. This construction is adapted so as to position the motor drive and gears of conveyor 25 as far away as possible from the hot furnace gases and moisture escaping upwardly from the charging mouth 10.

In the exemplified form of mechanism shown in Figures 1–9, the coordinated movements of the conveyors for the purpose of causing the point of delivery (point 129, Figure 4) to follow a systematic pattern (such as shown in Figures 1, 2 and 10–14) to lay down a uniformly thick layer of material over the perscribed area, is accomplished mechanically by utilizing a pantograph multiplier, and the use of such pantograph multiplier then requires a certain geometric relationship of the several parts as will be described. However, this need not be so, where other drives are used, such as hydraulic or electrical motion transmitting drives.

Referring to Figures 1–9, the pantograph drive utilizes the frame member 26 having the length defined by the distance between pivots 28 and 63 as one of the major pantograph elements, and conveyor 23 carries the material this distance from fixed pivot pin 28 to movable pivot pin 63. The other major pantograph element is the distance from movable pivot 63 to the discharge point 129 (Figures 1, 2 and 4; frame 61—70). Conveyor 25 thereon is shortened just enough to allow for the trajectory 86 (Figure 4). When using the pantograph drive the distance from pivot 28 to pivot 63 has to be equal to the distance from pivot 63 to the point of discharge 129, and to this extent the pantograph drive imposes dimensional requirements upon the Figures 1–9 system. Such dimensional requirements are not a requisite of the form of invention shown in Figure 15.

The other members of the pantograph are links 87 and 88 the latter being pivoted at pivot 89 to frame 61 (of conveyor 25) and the former pivoted at pivot 92 to frame 26 (of conveyor 23). A pivotal connection at 97 between links 87 and 88 is mechanically moved at a uniform rate along a certain pattern, which is schematically shown in Figures 1 and 2 as the closed pattern line 98 within area 99, and as a result the frames 26 (of conveyor 23) and 61 (of conveyor 25) are similarly moved in such a way that the discharge point 129 follows a similar pattern which is "enlarged" by a certain proportional amount depending upon the "multiplication ratio" of the pantograph linkages. It is evident that the pantograph multiplication ratio can be anything within reason; also that the path of travel depends merely upon how pivot 97 is guided, thus permitting the coverage of any selected area, such as those shown in Figures 10–14, so long as they are within the range of the apparatus.

Referring to Figures 1 and 2, the arm 88 of the pantograph is parallel to the longitudinal axis of conveyor 23 and is pivoted to cap screw 89 which is firmly attached to base plate 62 of conveyor 25. A nut and lock nut 90 are tightened on a reduced threaded portion 91 of pivot 89 to hold pantograph link 88 in place. Link 87 is similarly pivoted on stud 92 which is firmly attached to frame 26 of conveyor 23. It also has a reduced threaded portion 93 on which are threaded nuts 94 for securing the link 87 for arcuate motion therearound. The opposite ends of links 87 and 88 are pivoted together by means of a rivet 96 (Figure 8) or any other suitable pivot element, and the pivoted juncture of the two arms 87 and 88 forms a stylus assembly 97 which will be hereinafter more fully described.

Shown schematically in Figures 1 and 2 is an endless stylus track pattern 98. Dotted line 99 in Figures 1 and 2 indicates a clearance area around the tracking pattern 98 similar to the area enclosed by line 100 around furnace opening 10. An electric motor 85, as shown in Figures 1, 2, 8 and 9, is placed on the top surface of pantograph link 88 and functions to progress the stylus assembly 97 about endless tracking pattern 98 when in operation so that the discharge point 129 of the discharge path 86 of conveyor 25 will follow a discharge pattern over charging mouth 10 which is geometrically similar to, but enlarged, as compared with the endless pattern of the stylus track pattern 98. By appropriate selection of the pattern of delivery, rate of travel along the pattern or both, any desired depth-of-layer may be achieved including uniform layer depth.

The apparatus for moving the stylus pivot 96 of the pantograph arrangement about the prescribed path 98, Figures 1 and 2, may be variously contrived as a gear-rack drive (which is illustrated) or a chain drive having a chain run over suitably spaced pulleys at each bend (not illustrated). In the exemplary form a rack and gear drive is shown, a rack 116, Figure 8, being provided in an elevated position. The rack is shaped so that it forms the path 98 desired to be followed. Thus, referring to Figures 1–7, the rack 116, as illustrated, is composed of side walls 101 and 102 that are fastened together as a unitary structure and supported above flooring 9 by a suitable framing not illustrated. The rack 116 is attached by bolts 115 and it has a wide space in it for the rack gear 124 and a somewhat narrower space for the centering bearing 125. Two plates 118 are attached parallel to each other along the open bottom mouth of the rack 116 so as to leave a space 119 between them. Into this space there projects the pivot designated 123 which has a hub portion 121 that fits with only clearance in the space 119 between the two plates 118. At the bottom of the hub 121 there is a flange 122 having a centering dimple. This flange is a part of a magnetic coupling having a mating flange 112 and a magnetic coil 113 which is fed through the slip rings 111 and brushes thereon. This magnetic coupling is to permit the breaking of the connection between the drive and the pantograph upon power failure and is a safety device which can be omitted, if risks of power failure can be tolerated. The shaft 123 of the drive has a nut 126 at its upper end serving to hold in place a bearing, here shown as a sealed ball bearing assembly 125. The ball bearing outer race is of a size such that is fits neatly between the surfaces 127 and 128 of the rack assembly walls 101 and 102 respectively and thereby accurately positions the shaft 123 between them, and in so doing the gear 124 is held so that its teeth will mesh accurately along the pitch line of gear teeth 117 on the wall 101 of the rack. It may be noted that there are no corresponding gear teeth on the wall 102 since this would simply lock the gear 124 and prevent it from moving along. Also, the teeth on the rack assembly 116 can be on either one of the walls 101 or 102, but not on both.

The rotation of the shaft 123 and gear 124, which is held firmly on the shaft, is accomplished by a motor 85 having a shaft 103 driving through the housing 104 to the gear housing 108 containing a worm gear 106 and a mating gear 107 that is attached to the shaft 110. Thus, when the motor revolves the gear 107 is rotated and this drives the shaft 110 and through the magnetic coupling 112—122 the shaft 123 is rotated, thereby causing the pinion 124 to be rotated and as a result the shaft 123 is caused to progress along the length of the rack, around all of the curves and along the straight portions, at a steady pace which depends upon the speed of rotation of the motor 85.

The motor 85 is fed by a suitable power source L1 and L2 and the magnetic coupling is wired in parallel so that in the event power fails the magnetic coupling will be loosened and the arms 87—88 being slightly flexible will drop down, thereby separating the pantograph from the rack and pinion driving arrangement. When this occurs the conveyors are pulled out of the way entirely by a spring S as shown in Figures 1 and 2. The spring S is anchored firmly to a point on the plate 9 and extends over to a connection on the frame 26 of conveyor 23. Thus, when power fails the magnetic coupling separates and the frame 26 is pulled towards the drum 12, thus moving the delivery end of conveyor 25 away from a position over the furnace 10, regardless of the back and forth travel of the conveyor 25. This is a safety precaution to prevent burning of the belt if power fails.

As previously mentioned the cross sectional area of any furnace or other area over which material is to be evenly deposited or deposited according to a predetermined depth of layer pattern can be practically any shape desired within the range of the apparatus. Figures 10 through 14 illustrate various exemplary shapes. For the most part furnaces are made in round, square, rectangular or polygonal shape, although in some instances it is desirable to provide a "double" furnace or a multiple furnace. Such a double furnace is shown in Figure 14.

In Figures 10–14, there are shown furnace mouths of varying configurations and various endless patterns of point 129 placed thereon. For each such discharge pattern there is an identical pattern 98 of different scale controlling it. Thus, in Figure 10 is shown the rectangular furnace mouth 10 illustrated in Figures 1 and 2 with the dotted line 130 indicating the path of the point 129 thereon in response to the tracking of stylus 97 over pattern 98 and consequently the pattern of the charge upon the furnace bed is shown. In Figure 11 is shown a square furnace 131 with a different pattern 132 thereon. Figure 12 shows a circular furnace 133 with another different pattern 134 thereon. Figure 13 shows an octagonal furnace 135 again with a pattern 136 somewhat similar to the pattern 134 for circular furnace mouth 133. Figure 14 shows a dual rectangular furnace 139 with a partition 137 therebetween and feeding pattern 138 on the bed thereof. Note with reference to Figures 10–14 that patterns such as 132 and 138 are particularly to be desired since the path of point 129 and consequently the terminal end of the conveyor 25 may follow the direction of the arrows 140 and 141 and consequently the terminal end of the conveyor will continually remain over the portion of the furnace bed to which the charge has already been added. Thus, for example, with reference to Figure 11, if the conveyor 25 starts to discharge at point A and the path of point 129 follows the arrows 141 to points B, C, D, and to E in a vertical direction while shuttling from side-to-side with reference to Figure 11, and then returns from point F to point A and recommences this path, the terminal end of conveyor 25 will be substantially over a cool or just covered furnace bed and thus the working parts will not be exposed to extreme heat and consequent deterioration. By appropriate lay-out of the pattern of distribution any desired layering effect with uniform or non-uniform depth may be achieved. The uniform layer is considered desirable by many furnace operators.

In the form of invention illustrated in Figures 1–9 a mechanical motion transmission is provided between the point 97 and the conveyor frames 29—31 and 61—70 for determining the motion of the delivery point 129 of the conveyor mechanism. This mechanical transmission is known as a pantograph mechanism. Other forms of transmissions may also be provided, such as electrical or hydraulic. An exemplary form of electrical transmission for transmitting the motion of a moving point at a signal station and thereby duplicating on a much larger scale a corresponding motion of the conveyors, is illustrated in Figure 15. Also, in Figure 15, there is illustrated the manner in which one remote signal transmitting station at T may be utilized for controlling the operation of several parallel operated distributing stations of which one such station is shown at DD.

In Figure 15 the conveyor mechanism at each of the distributing station DD is provided in the first place with some apparatus such as the drum 12 for manufacuring and/or delivering in a constant stream the material which is to be deposited in continuously spread uniform layers. Thus, the drum 12 operating as previously described, dumps the material over the screening device 17 for delivery over the spout 22 onto the first of the conveyors 23. The conveyor 23 is constructed similar to that shown in the device illustrated in Figures 1–9 and has a frame pivoted at point 28. The frame extends out so as to support the conveyor 23 thereon. The outer end of the frame 26 which supports the conveyor 23 is carried by the wheels 29—29—30 operating on the rails 32—33 respectively.

Similarly, upon the portion 33 of the lower frame 24 there is pivotally mounted at the movable pivot 63 the back or loading end of the frame 61 upon which the conveyor 25 is mounted, and this conveyor on its supporting frame pivots around the movable pivot point 63 and is supported about midway of its length by the wheels 65 operating upon the arcuate rail 67. As a result there is a delivery point 129 within the furnace area 10 at the bottom of the trajectory of material delivered off the moving belt 77 of the conveyor 25. The conveyor 23 is of a length and located so that it delivers at substantially through the movable pivot point 63.

So far the apparatus of Figure 15 is similar to that shown in Figures 1–9.

In the Figure 15 exemplification the motion of the frames carrying the conveyors 23 and 25 is provided by a pair of motors 160 and 161. The motor 160 is mounted upon the lower frame 24 and determines the arcuate swinging motion of this frame and the conveyor 23. This motor 160 is provided with a pinion 167 which works along the arcuate rack 165 supported on the charging floor 9. The motor 160 is of the Selsyn type but may be any motion transmitting motor. It may drive its pinion 167 directly or through intermediate gearing. The motor 160 is reversible and the amount and the direction of rotation that it moves is determined by the phase relationship and duration of the signal current in its feed wires 159 as is well known. Thus, by operating the motor 160 first one way and then the other, the entire frame 26 may be swung back and forth arcuately about the pivot 38 and with it is carried the two conveyors 23 and 25.

The arcuate swinging movement of the conveyor 25 about the movable pivot 63 is similarly accomplished. Thus, upon the frame 61 (which carries the conveyor 25) there is mounted a second motion transmitting motor 161 which is served by the three control wires 158. This motor, either directly or through intermediate gearing, drives its pinion 168 which operates against an arcuate rack 164 mounted upon the portion 31 of the swinging frame 24. Accordingly, depending upon the signal current received through the lead 158, the operation of the motor 161 will cause the conveyor 25 to be swung arcuately to various positions within its range of travel about the pivot 63.

The transmitter for producing the requisite signal current for operation of the motors 160 and 161 at each of the receiving stations is shown at T in the lower part of Figure 15. In this figure there is provided a linkage generally designated 150 composed of an arm 142 pivoted about the point 141′. This arm 142 has on it an outer portion 151 and a movable pivot point 170. Upon the movable pivot point 170 there is mounted the radial arm 143 having a tip 144 corresponding to the delivery point 129 of the receiving stations.

The point 144 is arranged to be moved mechanically at a constant pace along any suitable path 145 by a mechanical mechanism such as that shown for moving the pantograph stylus 97 along the path 98 in Figures 1–9. The fixed point 141′ on the arm 142 corresponds geometrically to the fixed pivot point 28 for the framework 26 of conveyor 23. The movable pivot point 170 on the arm 142 corresponds geometrically to the movable pivot point 63. Similarly, the point 144 corresponds geometrically to the delivery point 129.

The distance between the points 141′ and 170 may be the same as the distance between the points 28 and 63 but it is preferably smaller such as ⅛ to ½ as large. The ratio of these dimensions 28—63 to the dimensions 141′—170 is the multiplication ratio. The same ratio holds good for the dimensions 170—144 and 63—129. Thus, Multiplication ratio =

$$\frac{\text{Distance between 28 and 63}}{\text{Distance between 141' and 170}} = \frac{\text{Distance between 63 and 129}}{\text{Distance between 170 and 144}}$$

The actual dimensions between 141′ and 170 and between 170 and 144 may be very much smaller than the dimensions of the corresponding links of the conveyor supporting frames with the result that the transmitter station may be relatively small as compared with the actual conveyor mechanisms. The only limitation is that the links 143 and 142 and their mechanical construction should be sufficiently rugged to operate the Selsyn transmitters to which they are geared. Thus, under the member 142 there is a Selsyn transmitter 148 which is geared through the pinion 147 to the rack 146. The length of the rack 146 and the size of the pinion 147 are chosen so that for a given angular motion of the arm 142 about point 141′ the Selsyn transmitter gear 147 will be given a certain number of revolutions and the corresponding number of revolutions produced in the Selsyn receiver 160 will through its gear 167 operating on the rack 165 produce a corresponding angular motion of the conveyor 23 about its pivot 28. The exact location of the Selsyn transmitter 148 and its rack 146 and location of Selsyn receiver 160 and rack 165 therefore becomes unimportant so long as the angular motion achieved by the conveyor 23 about its pivot 28 corresponds in angularity to the motion of the arm 142 about its pivot 141′. Similarly, the arm 143 on the transmitter carries another Selsyn transmitter 154 which is geared through its pinion 153 to operate against the rack 152 which is carried on member 151. Accordingly, as the arm 143 is moved arcuately about pivot 170 the transmitter 154 will be operated and transmit a signal over the lines 155 to Selsyn receiver 161 which then causes the conveyor 25 to be moved a similar angular distance.

Accordingly, as the point 144 is mechanically moved at a constant pace along the line 145 at the transmitting station T, the arms 143 and 142 will cause certain rotations of the transmitters 148 and 154 which therefore generate and transmit corresponding signals over the lines 166—159 and 155—158 respectively.

If desired, the point 144 may be disconnected from its mechanical movement, and since it is small, it may be moved by hand, thereby causing corresponding movement of the furnace conveyors. This is desirable for correcting any slow spots or other defects in the pattern that might result from uneven furnace operation, as for example by settling in one place.

At 156 and 157 there is illustrated amplifiers by means of which the Selsyn signal from the transmitter station T may be amplified to any requisite degree for operating much larger Selsyn receivers at the furnace station. Each of the amplifiers 156 and 157 is fed from power lines L1 and L2 and the transmitters are selected so as to provide straight line amplification. Thus, the signal currents in lines 158 correspond exactly to the signal currents in the lines 155, except that they are amplified and the signal currents in the lines 159 correspond exactly to the signal currents in the lines 166 except that they are amplified. As a result the angular motions of the links 142 and 143 are exactly duplicated at the furnace station by the angular motions of the two conveyors 23 and 25 respectively and accordingly the load carried by the conveyor is distributed uniformly along a path corresponding in pattern to the path 145 but on a scale which is enlarged, as compared with path 145, the amount of proportional enlargement being dependent upon the multiplication ratio of the system.

In the mechanism shown in Figures 1–9 it was necessary, due to the pantograph transmitter that is used, to have the same distance between the pivot 28 and pivot 63 as the distance between the pivot 63 and the delivery point 129 of the conveyor 25. Such geometric relationship was imposed by the type of mechanical transmitter (pantograph) that was utilized. However, when utilizing the electrical (Selsyn) transmitter, as shown in Figure 15, such dimensional relationship is no longer required, and accordingly the distance between pivots 42 and 63 may be smaller or larger than the distance between pivots 63 and the delivery point 129. The only requirement is that the transmitting and receiving stations should be proportional although they need not be equal dimensions. Thus, the distance 141—170 is proportional to a certain ratio to the distance 28—63 and the distance 170—144 is proportional in the same ratio to the distance 63—129.

The signal currents delivered to the lines 158 and to the lines 159 may, if desired, be carried by parallel lines 162 and 163, respectively, to any number of furnace stations. Each of the furnace stations is identical with that shown for the furnace station DD in Figure 15 and connected similarly. As a result a single remote transmitter station T, at which the point 144 is mechanically moved along a predetermined path 145 may be utilized for controlling one or any number of remote furnace stations DD.

As many apparently widely differing embodiments of this invention may be made without departing from the spirit and scope thereof, it is to be understood that I do not limit myself to the specific embodiments disclosed herein.

What I claim is:

1. A conveying mechanism comprising a linkage of not less than two members, one member being attached at one end to a stationary pivot point and at the other end to a second member through a movable pivot point, means on the first member for conveying material from adjacent the stationary pivot to its other end, means on the second member for transporting said material from the pivoted end to the free end thereof, and motor means connected to said first and second members for cooperative movement thereof for moving the point of discharge of said second member along an endless predetermined path of discharge.

2. The apparatus of claim 1 further characterized in that said motor means is electrical and is controlled from a station remote from said first and second members.

3. The apparatus of claim 2 further characterized in that said remote control station controls the movement of a plurality of independent conveying mechanisms each composed of similar first and second members.

4. A conveying and distributing mechanism comprising a first longitudinally extended conveyor having receiving and discharge ends, pivotably mounted at its receiving end for movement of its discharge end arcuately around said pivot, a second longitudinally extended conveyor having a receiving end and discharge end, and pivotally attached to the discharge end of said first conveyor in a position to receive material delivered thereby on its receiving end and means for moving the first and second conveyors each about its pivot at rates such that the discharge point of the second conveyor will be moved along a path at a predetermined rate of speed.

5. The apparatus of claim 4 further characterized in that means is provided for feeding bulk solid material onto the first conveyor at a substantially constant rate.

6. The apparatus of claim 5 further characterized in that means is provided for interrupting the flow of material from said means for feeding at spaced time intervals such that no material will be delivered off the discharge end of the second conveyor as the discharge point crosses predetermined points along said predetermined path of discharge.

7. The apparatus of claim 4 further characterized in that said means for moving said first and said second conveyors about their pivots comprises a first remote member provided with a stationary pivot at one end and connected to a second remote member through a movable pivot, means for moving the free end of said second remote member along a predetermined endless pattern, and electrical means connected to said first and second remote members for moving said first and second conveyors respectively in relation thereto.

8. The apparatus of claim 7 further characterized by having a selsyn motor on said first remote member connected to said first conveyor means and a selsyn motor on said second remote member connected to said second conveyor means, whereby movement of the free end of said second remote member about said endless pattern will actuate said first and second selsyn motors on said first and second remote members for controlling the movement of said first and second conveyors.

9. A conveyor mechanism comprising a linkage of two substantially equal length members, one member being attached at one end to a stationary pivot point and at the other end to the second member through a movable pivot point, means for delivering to the first member material to be conveyed, means for conveying the material therealong, means for conveying material along said second conveyor and means for moving the discharge point of the second member so as to cause it to follow a predetermined planar pattern.

10. The apparatus of claim 9 further characterized in that said means for moving the discharge point of said second member so as to cause it to follow a predetermined pattern moves said discharge point at uniform linear velocities.

11. A conveyor mechanism comprising in combination a substantially horizontally disposed frame, comprising a linkage of first and second substantially equal length members, the first frame member being attched at one end to a stationary pivot point and at the other end to the second frame member through a movable pivot point, means on each member for conveying material lengthwise and in succession from adjacent the fixed pivot point, thence along one frame member, through a position adjacent the movable pivot point and thence to the end of the second frame member, and means for moving the first and second frame members so as to carry the end of the second frame member along a predetermined closed path at predetermined velocity pattern.

12. A conveyor and distributor apparatus comprising in combination a first linear conveyor having a free end pivoted for rotation about a fixed end thereof, a second linear conveyor pivoted for rotation about the free end of said first conveyor, a supporting frame for said first linear conveyor and an arcuate supporting means operable in cooperation therewith whereby said free end of said first conveyor may be freely pivoted about said fixed end, said second linear conveyor being pivoted on said supporting frame for said first conveyor, second arcuate means located on said supporting frame whereby the free end of said second conveyor may be freely pivoted around said free end of said first conveyor.

13. A conveyor and distributor apparatus comprising in combination a first endless belt conveyor having a free end pivoted for rotation about a fixed end thereof, a second endless belt conveyor pivoted for rotation about the free end of said first conveyor, a supporting frame for said first endless belt conveyor and an arcuate supporting means operable in cooperation therewith whereby said free end of said first conveyor may be freely pivoted about said fixed end, said second endless belt conveyor being pivoted on said supporting frame for said first conveyor, second arcuate means located on said supporting frame whereby the free end of said second conveyor may be freely pivoted around said free end of said first conveyor.

14. A conveyor and distributor apparatus comprising in combination a first linear conveyor having a free end pivoted for rotation about a fixed end thereof, a second linear conveyor pivoted for rotation about the free end of said first conveyor, the free end of said second conveyor comprising the discharge or inscribing end of a pantograph, a supporting frame for said first conveyor and an arcuate supporting means operable in cooperation therewith whereby said free end of said first conveyor may be freely pivoted about said fixed end, said second conveyor being pivoted on said supporting frame for said first conveyor, second arcuate means located on said supporting frame whereby the free end of said second conveyor may be freely pivoted around said free end of said first conveyor, a first arm pivoted to said first conveyor and a second arm pivoted to said second conveyor, said first and second arms being connected at their opposite end to form a tracing stylus, an endless pattern and means for causing said tracing stylus to track around said endless pattern.

15. The apparatus of claim 13 further characterized in that said first and second arms are provided at said opposite ends with means for magnetically connecting and disconnecting said ends.

16. The apparatus of claim 13 further characterized by remote control means for moving the discharge end of said second conveyor to describe a predetermined pattern.

17. A mechanism for conveying materials comprising first and second conveyors each having a frame and conveyor means thereon for moving material therealong, each of said conveyors having a receiving end and a delivery end, said conveyors being positioned end-to-end and so that the first conveyor delivers onto the second, the two being disposed so that in cooperation with each other so as to transport material between horizontally disposed locations, an erect fixed pivot, the receiving end of the first conveyor being journalled on said fixed pivot for arcuate movement of its delivery end therearound, a movable pivot pivotally connecting the delivery end of the first conveyor and the receiving end of the second conveyor for movement of the delivery end of the second conveyor arcuately around said movable pivot, wheeled means for supporting the weight of said second conveyor and the loads carried thereon as the conveyor moves, wheeled means for supporting the weight of said first conveyor as the conveyor moves and means for supporting said wheeled means for said second conveyor carried by said first conveyor.

18. A mechanism for conveying materials comprising first and second conveyors each having a frame and conveyor thereon and means for operating said conveyor, each of said conveyors having a receiving end and a delivery end, said conveyors being positioned end-to-end and so that the first conveyor delivers onto the second, the two being disposed so that in cooperation with each other they transport material between horizontally disposed locations, an erect fixed pivot, the receiving end of the first conveyor being journalled on said fixed pivot for arcuate movement of its delivery end therearound, a movable pivot pivotally connecting the delivery end of the first conveyor and the receiving end of the second conveyor for movement of the delivery end of the second conveyor arcuately around said movable pivot, wheeled means for supporting the weight of the conveyors and the loads carried thereon, and means connected to each of said conveyors for moving the delivery end of the second conveyor along a prescribed path within a prescribed area.

19. A mechanism for conveying materials comprising first and second linear conveyors each having a frame and a conveyor thereon and means for running said conveyor for moving material therealong, each of said conveyors having a receiving end and a delivery end, said conveyors being positioned end-to-end and so that the first conveyor delivers onto the second, the two being disposed so that in cooperation with each other they transport material between horizontally disposed locations, an erect fixed pivot, the receiving end of the first conveyor being journalled on said fixed pivot for arcuate movement of its delivery end therearound, a movable pivot pivotally connecting the delivery end of the first conveyor and the receiving end of the second conveyor for movement of the delivery end of the second conveyor arcuately around said movable pivot, means for supporting the weight of the conveyors and the loads carried thereon as the conveyors move, means for moving the delivery end of the second conveyor along a prescribed path within a prescribed area and bias means urging said second conveyor to a position remote from said prescribed area.

20. A mechanism for conveying materials comprising first and second endless conveyors each having a frame and endless conveyor belt thereon and means for running said belt, each of said conveyors having a receiving end and a delivery end, said conveyors being positioned end-to-end and so that the first conveyor delivers onto the second, the two being disposed so that in cooperation with each other they transport material between horizontally disposed locations, an erect fixed pivot, the receiving end of the first conveyor being journalled on said fixed pivot for arcuate movement of its delivery end therearound, a movable pivot pivotally connecting the delivery end of the first conveyor and the receiving end of the second conveyor for movement of the delivery end of the second conveyor, arcuately around said movable pivot, means for supporting the weight of the conveyors and the loads carried thereon, as the conveyors move, means for moving the delivery end of the second conveyor along a prescribed path within a prescribed area comprising a pantograph arrangement of four pantograph links pivotally connected together in parallelogram plan, a first pantograph link, said link being a portion of the first conveyor extending between a first pantograph pivot point located substantially at the movable pivot connecting the first and second conveyors and a second pantograph pivot located on the first conveyor between the receiving and delivery ends of the first conveyor, a second of said pantograph links being a portion of the second conveyor extending between said first pantograph pivot point and a third pantograph pivot located on the second conveyor between its receiving and delivery ends, a third pantograph link having a length equal to the first link, said third link being pivoted to the third pantograph pivot, and fourth pantograph link having a length equal to that of the second pantograph length, said fourth link being pivoted on the second pantograph pivot, a fourth pantograph pivot point connecting the third and fourth pantograph links, and power means for moving said fourth pantograph pivot point along a prescribed path in a prescribed area for thereby moving the delivery end of the second conveyor along an enlarged similar path.

21. The apparatus of claim 20 further characterized in that the means for moving said fourth pantograph link moves it along a closed non-crossing path.

22. The apparatus of claim 20 further characterized in that said power means for moving said fourth pivot connection is automatically disconnected upon power failure, and means is provided for biasing the second conveyor to a position such that no part of the conveyor is over said enlarged similar path.

23. A system for delivering bulk material over a prescribed area by remote control comprising at least one conveyor station including first and second conveyors each having a frame and means for running said conveyor, each of said conveyors having a receiving end and a delivery end, said conveyors being positioned end-to-end so that the first conveyor delivers onto the second, the two being disposed so that in cooperation with each other they transport material between horizontally disposed locations, an erect fixed pivot, the receiving end of the first conveyor being journalled on said fixed pivot for arcuate movement of its delivery end therearound, a movable pivot pivotally connecting the delivery end of the first conveyor and the receiving end of the second conveyor for movement of the delivery end of the second conveyor arcuately around said movable pivot, means for supporting the weight of the conveyors and the loads carried thereon, as the conveyors move, a remote transmitter station for moving the delivery end of said second conveyor along a prescribed path within a prescribed area comprising first and second frame links proportionately similar respectively to the first and second conveyors, the first link being correspondingly pivoted upon a fixed pivot, the two links being correspondingly pivotally connected together by a corresponding movable pivot so that together they are capable of movement corresponding respectively to the movements of the first and second conveyors at the conveyor station, means at the transmitter station for moving the second link so that the end thereof opposite to its pivotal connection to the first link and corresponding to the delivery end of the second conveyor at the conveyor station follows a path geometrically similar in pattern to the desired path of movement of the delivery end of the second conveyor at said conveyor station, first and second motion transmitter means at the transmitter station respectively connected to the first and second links so as to be moved as the links are moved arcuately, first and second motion reproducing motors connected respectively to said first and second motion transmitter means and mounted for mechanically driving said first and second conveyors arcuately proportional to the arcuate movement of said first and second links.

24. The apparatus of claim 23 further characterized in that several complete conveyor stations are provided and are driven in parallel by the transmitter station.

25. The apparatus of claim 23 further characterized in that the first and second motion transmitter means are selsyn generators and the motion reproducing motors are selsyn generators.

26. The apparatus of claim 23 further characterized in that biasing means is provided at the conveyor station for moving the conveyors to a remote condition upon failure of the apparatus.

27. A conveying and distributing mechanism comprising a first longitudinally extended conveyor having receiving and discharge ends, pivotably mounted at its receiving end for movement of its discharge end arcuately around said pivot, a second longitudinally extended conveyor having a receiving end and discharge end, and pivotally attached to the discharge end of said first conveyor in a position to receive material delivered thereby on its receiving end, means for moving the first and second conveyors each about its pivot, said means for moving said first and second conveyors about their pivots comprising a pair of arms, one attached to said first conveyor and one attached to said second conveyor, said arms being attached together at the opposite ends thereof, and means for progressing the attached ends of said attached arms along a predetermined endless pattern.

28. A conveying mechanism comprising in combination, a first and a second conveyor, said first conveyor being attached at one end to a stationary pivot point and at the other end to said second conveyor through a movable pivot point, said first conveyor having receiving and discharge ends and being pivoted at its receiving end for movement of its discharge end arcuately around said stationary pivot, said second conveyor having receiving and discharge ends and being pivoted at its receiving end to the discharge end of said first conveyor in a position to receive material delivered therefrom, remote means connected to said first and said second conveyors for moving each about its pivot simultaneously and in coordination, said remote means including a stylus means positioned for movement around an endless track pattern, an endless track pattern for guiding said stylus means and motor means for progressing said stylus means along said track pattern.

References Cited in the file of this patent

UNITED STATES PATENTS

| | | |
|---|---|---|
| 1,446,124 | Lichtenberg | Feb. 20, 1923 |
| 1,456,715 | Reck | May 29, 1923 |
| 2,649,185 | Lichtenberg | Aug. 18, 1953 |